US011423416B2

(12) United States Patent
Appadurai et al.

(10) Patent No.: US 11,423,416 B2
(45) Date of Patent: Aug. 23, 2022

(54) IMPACT BASED FRAUD DETECTION

(71) Applicant: Apple Inc., Cupertino, CA (US)

(72) Inventors: Vijayanand Appadurai, Sunnyvale, CA (US); Andrea Bravi, London (GB); Nagaraj Hatti Veerarajan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/906,205

(22) Filed: Jun. 19, 2020

(65) Prior Publication Data

US 2021/0398144 A1   Dec. 23, 2021

(51) Int. Cl.
*G06Q 30/00* (2012.01)
*G06F 21/62* (2013.01)
*H04L 9/40* (2022.01)

(52) U.S. Cl.
CPC ..... *G06Q 30/0185* (2013.01); *G06F 21/6254* (2013.01); *H04L 63/00* (2013.01)

(58) Field of Classification Search
CPC ..... G06Q 30/0185; G06F 21/60; G06F 16/00; G06F 16/20; G06F 16/21; G06F 16/25; G06G 21/60; G06G 21/62; G06G 21/6218; G06G 21/6245; G06G 21/6227
See application file for complete search history.

(56) References Cited

U.S. PATENT DOCUMENTS

| 7,822,631 B1 * | 10/2010 | Vander Mey | G06Q 30/0201 705/7.29 |
| 2013/0269038 A1 * | 10/2013 | Takahashi | G06F 21/60 726/26 |
| 2014/0365398 A1 * | 12/2014 | Dalton | G06Q 30/0282 705/347 |

(Continued)

FOREIGN PATENT DOCUMENTS

| EP | 3200136 A1 * | 8/2017 | ............. G06Q 10/10 |
| JP | 2007094848 A * | 4/2007 | |

(Continued)

OTHER PUBLICATIONS

Zhong et al "Identification of Opinion Spammers using Reviewer Reputation and Clustering Analysis" International Journal of Computers Communications & Control ISSN 1841-9836, e-ISSN 1841-9844, 14(6), 759-772, Dec. 2019. (Year: 2019).*

(Continued)

*Primary Examiner* — Gerardo Araque, Jr.
(74) *Attorney, Agent, or Firm* — Invoke

(57) ABSTRACT

In some implementations, a computing device can be configured to perform impact-based fraud detection. For example, a computing device (e.g., a network server) can receive user submissions from user devices corresponding to traffic incident reports, point of interest (POI) ratings, product ratings, vendor ratings, and/or other crowd-sourced information. The computing device can identify groups of users based on the user submissions and various grouping (Continued)

criteria. The computing device can determine the impact of these user groups with respect to the targets (e.g., traffic in an area, ratings of a business, etc.) of their user submissions. The computing device can prioritize high impact user groups when attempting to detect fraudulent user group activity (e.g., fraud rings).

18 Claims, 7 Drawing Sheets

(56) References Cited

U.S. PATENT DOCUMENTS

| | | | | |
|---|---|---|---|---|
| 2015/0095247 A1* | 4/2015 | Duan | ............ | G06Q 30/0185 |
| | | | | 705/318 |
| 2015/0356643 A1* | 12/2015 | Kohm | ............ | G06Q 30/0282 |
| | | | | 705/347 |
| 2016/0012194 A1* | 1/2016 | Prakash | ............ | G16H 40/40 |
| | | | | 705/2 |
| 2016/0283497 A1* | 9/2016 | Singh | ............ | G06F 16/35 |
| 2018/0239832 A1* | 8/2018 | Galuten | ............ | G06Q 10/10 |
| 2019/0122149 A1* | 4/2019 | Caldera | ............ | G06Q 10/0635 |
| 2019/0272316 A1* | 9/2019 | Ben Ami | ............ | G06F 40/30 |

FOREIGN PATENT DOCUMENTS

| | | | | |
|---|---|---|---|---|
| JP | 5846548 B2 * | 1/2016 | ............ | G06F 21/60 |
| WO | WO-2012031262 A1 * | 3/2012 | ......... | G06Q 30/0214 |
| WO | WO-2019069324 A1 * | 4/2019 | ............ | G06F 17/18 |

OTHER PUBLICATIONS

Ben Khalifa M, Elouedi Z, Lefèvre E. Evidential Group Spammers Detection. Information Processing and Management of Uncertainty in Knowledge-Based Systems. May 15, 2020;1238:341-53. doi: 10.1007/978-3-030-50143-3_26. PMCID: PMC7274645. (Year: 2020).*

Chang Xu. 2013. Detecting collusive spammers in online review communities. In Proceedings of the sixth workshop on Ph.D. students in information and knowledge management (PIKM '13). Association for Computing Machinery, New York, NY, USA, 33-40. DOI:https://doi.org/10.1145/2513166.2513176 (Year: 2013).*

Ahmed H, Traore I, Saad S. Detecting opinion spams and fake news using text classification, Security and Privacy, Dec. 29, 20117;1:e9. https://doi.org/10.1001/spy2.9 (Year: 2017).*

Becky Little "How We Got Social Security Numbers"; Oct. 5, 2017, https://web.archive.org/web/20171005062823/https://www.history.com/news/how-we-got-social-security-numbers# (Year: 2017).*

Binance Academy, "History of Cryptography" Jan. 14, 2019, https://academy.binance.com/en/articles/history-of-cryptography (Year: 2019).*

Li, W., & Kwak, J. K. (2019). Analysis of fraud on A Chinese business review website. Journal of Applied Business Research, 35(5), 129-144. (Year: 2019).*

The New York Times, "A Guide to the Language and Customs of Sports Betting" Jan. 19, 1975, p. 201, https://www.nytimes.com/1975/01/19/archives/a-guide-to-the-language-and-customs-of-sports-betting.html (Year: 1975).*

The United States Patent and Trademark Office, "Docket Number", Jan. 3, 2007, https://web.archive.org/web/20070103231125/ (Year: 2007).*

Yale University, Student Identification Number (SID), Jan. 31, 2016, https://web.archive.org/web/20160131164318/https://finaid.yale.edu/award-letter/financial-aid-terminology/student-identification-number-sid (Year: 2016).*

Stackoverflow, "How to separate a person's identity from his personal data?" Sep. 2010, https://stackoverflow.com/questions/3691348/how-to-separate-a-persons-identity-from-his-personal-data (Year: 2010).*

* cited by examiner

IMPACT BASED FRAUD DETECTION

TECHNICAL FIELD

The disclosure generally relates to detecting fraudulent user activity related to crowd sourced submissions.

BACKGROUND

Many computer-based services allow users to submit information in support of these services. For example, a point of interest (e.g., business, restaurant, venue, park, etc.) review application may allow users to submit reviews, ratings, images, and/or other content related to a point of interest. Navigation applications may allow users to submit incident reports identifying the location of unusual traffic, accidents, police checkpoints, and/or other navigation related information. In some cases, some users may organize and work together to fraudulently influence (positively or negatively) the ratings of businesses and/or traffic patterns. Detection of these fraudulent groups of users may be difficult and/or time consuming.

SUMMARY

In some implementations, a computing device can be configured to perform impact-based fraud detection. For example, a computing device (e.g., a network server) can receive user submissions from user devices corresponding to traffic incident reports, point of interest (POI) ratings, product ratings, vendor ratings, and/or other crowd-sourced information. The computing device can identify groups of users based on the user submissions and various grouping criteria. The computing device can determine the impact of these user groups with respect to the targets (e.g., traffic in an area, ratings of a business, etc.) of their user submissions. The computing device can prioritize high impact user groups when attempting to detect fraudulent user group activity (e.g., fraud rings).

Particular implementations provide at least the following advantages. Submissions by individual users can only have a limited impact on submission targets (e.g., traffic patterns, POI ratings, product ratings, vendor ratings, etc.). However, an organized group of users may have a significant impact on these submission targets. Thus, by identifying user groups and analyzing the user submissions of user groups, the computing device can be used to more efficiently identify and block malicious users and user groups (e.g., fraud rings) who are having the biggest impact on these submission targets. Moreover, by quantifying the impact of user groups on submission targets, the computing device can focus processing resources on high impact groups of users thereby increasing the efficiency with which the most influential fraud rings can be identified.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
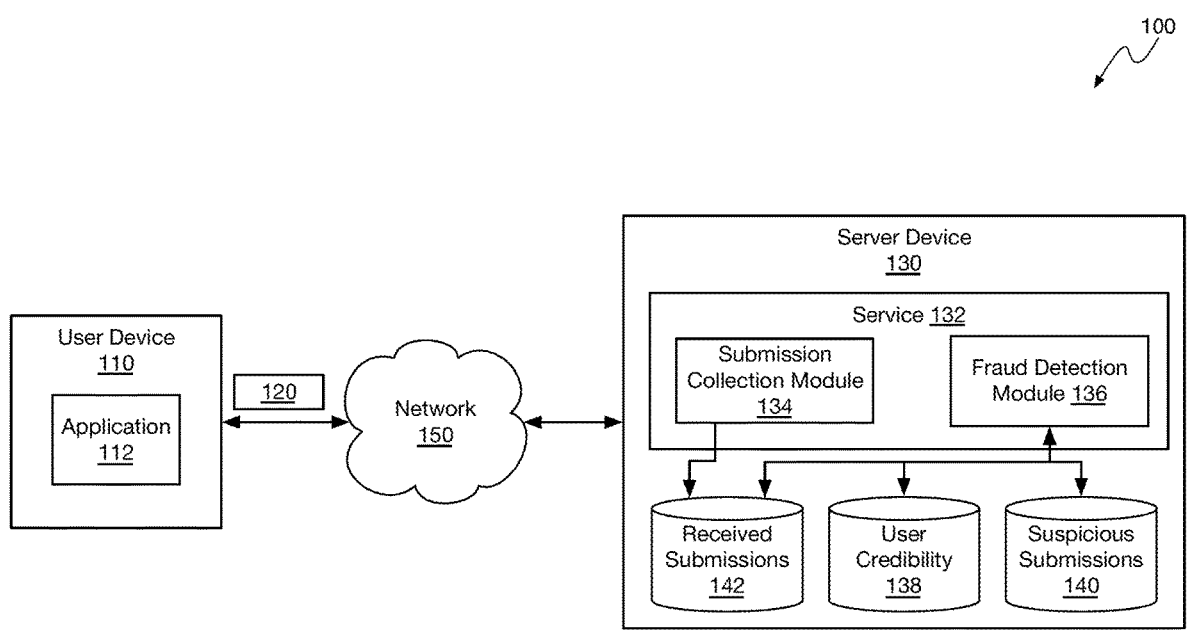
FIG. 1 is a block diagram of an example system configured for impact-based fraud detection.

FIG. 1 is a block diagram of an example system 100 configured for impact-based fraud detection. For example, system 100 can be configured to analyze individual and/or group submissions to identify and/or block unreliable and/or malicious users and/or user groups (e.g., fraud rings) from fraudulently influencing point of interest (POI) ratings and/or traffic patterns, among other things.

In some implementations, system 100 can include user device 110. For example, user device 100 can be a computing device, such as a laptop computer, tablet computer, smartphone, smart watch, smart glasses, wearable device, or any other computing device. Since system 100 is related to crowd-sourced data collection, system 100 may include multiple (e.g., tens, hundreds, thousands, etc.) user devices 110 that may be used by different users each having their own user accounts that may be used to submit the crowd sourced data (e.g., POI reviews, traffic incident reports, etc.) described herein. However, for simplicity, system 100 only depicts a single user device 110.

In some implementations, user device 110 can include application 112. For example, application 112 can be a client application configured to interact with a service on a server device accessible through network 150 (e.g., the Internet, wide area network, local area network, wireless network, cellular network, etc.) to provide a service to the user of user device 110. As is typical of many services, application 112 can be configured to allow users of valid user accounts registered with the network service to submit information 120 (e.g., reviews, traffic incident reports, etc.) to the corresponding network service so that other users can benefit from the submitted information. However, increasingly, this reliance on crowd-sourced, user-submitted information can be abused and used to fraudulently influence the behaviors of other users and impact (positively or negatively) businesses, traffic patterns, and/or purchases of other users who use these online, network services.

In one example, application 112 can correspond to a navigation application. The navigation application can be configured to allow users to report traffic incidents and/or errors in traffic incidents presented by the navigation application. For example, a user may interact with application 112 to report the location of an accident, traffic jam, police checkpoint, or other traffic related event (e.g., traffic incident). The user can use application 112 to submit a traffic incident report to a corresponding navigation service on a network server so that other users of other user devices can be informed of the traffic incident and adjust their travels accordingly. For example, the traffic incident report can identify a type of traffic incident (e.g., police checkpoint, traffic jam, accident, construction, etc.), an indication of whether the incident exists or does not exist (e.g., a true/false flag), a location of the traffic incident, a user account associated with the user submitting the report, a location of the user device submitting the report, a device identifier for the user device, an authentication token provided by the corresponding service to the user device that can be used to access the network service, and/or other data as may be described herein below.

In another example, application 112 can correspond to a point of interest (POI) review application. The POI review application can be configured to allow users to submit information rating a POI. For example, a user may interact with application 112 to submit a rating for a POI, including a textual review and/or description of the POI, an image (e.g., a photograph) associated with the POI, and/or a rating (e.g., a star rating, a numerical rating, etc.) for the POI. The user can use application 112 to submit a POI rating to a corresponding POI rating service (e.g., review service) on a network server so that other users of other user devices can be informed of the user's opinions related to points of interest and adjust their interactions with (e.g., patronage of, visits to, business with, etc.) the POIs accordingly. For example, the POI rating submission can include an identifier for the POI (e.g., business name, location name, venue name, etc.), a type identifier for the POI, a location of the POI, a user account associated with the user submitting the rating, a location of the user device submitting the rating, a device identifier for the user device, an authentication token provided by the corresponding service to the user device that can be used to access the network service, and/or other data as may be described herein below.

In another example, application 112 can correspond to an online marketplace application. The online marketplace application can be configured to allow users to submit information rating products sold and/or vendors selling through the online marketplace. For example, a user may interact with application 112 to submit a rating for a product and/or vendor, including a textual review and/or description of the product/vendor, an image (e.g., a photograph) associated with the product/vendor, and/or a rating (e.g., a star rating, a numerical rating, etc.) for the product/vendor. The user can use application 112 to submit a product/vendor rating to a corresponding online marketplace service on a network server so that other users of other user devices can be informed of the user's opinions related to product/vendor and adjust their interactions with (e.g., patronage of, visits to, business with, purchases of, etc.) the product/vendor accordingly. For example, the product/vendor rating submission can include an identifier for the product/vendor (e.g., business name, product name, seller name, etc.), a user account associated with the user submitting the rating, a location of the user device submitting the rating, a device identifier for the user device, an authentication token provided by the corresponding online marketplace service to the user device that can be used to access the network service, and/or other data as may be described herein below.

In some implementations, system 100 can include server device 130. For example, server device 130 can be a network computing device configured to host and/or provide network, software services to user devices (e.g., user device 110) through network 150. While only one server device 130 is shown in FIG. 1 for simplicity, system 100 can include multiple server devices 130 that host the same, or different, services.

In some implementations, server device 130 can include service 132. Service 132 can be a software server that receives requests from and/or serves data to application 112. Thus, application 112 and service 132 can form a client/server relationship that provides a service to the user of user device 110. Continuing the examples above, service 132 can be a navigation service, a POI rating service, an online marketplace service, or any other type of service that relies upon or uses crowd sourced user input to provide a service to end users.

In some implementations, service 132 can include submission collection module 132. For example, submission collection module 134 can be configured to receive user submissions (e.g., traffic incident reports, POI ratings, online marketplace ratings, etc.) from client applications (e.g., application 112) on user devices (e.g., user device 110). Submission collection module 134 can validate the user accounts associated with the user submissions to ensure that user submissions are only accepted from valid user accounts. For example, submission collection module 134 can receive submissions from application 112 on user device 110 that include a device identifier, a user account identifier, an authorization token previously provided to application 112/user device 110 by service 132, and/or other validation data as may be described herein. Submission collection module 134 can determine whether the device identifier, user account identifier, and/or authorization token are associated with a valid user account registered with service 132. If the user account is not valid, submission collection module 134 can reject the submission. If the user account is valid, submission collection module 134 can send the user submission (e.g., submission 120) to fraud detection module 136.

In some implementations, after submission collection module 134 validates the user account associated with a received user submission, submission collection module 132 can replace the user identification information (e.g., user account, user identifier, user device identifier, etc.) received in the user submission with a surrogate identifier. For example, the surrogate identifier can be a unique identifier generated by service 132 that cannot be used by external systems to trace the data (e.g., location data) received in user submissions back to a specific user or user device. The surrogate identifier can be used to store received submissions, suspicious submissions, and user credibility data, as described further below. By using surrogate identifiers when storing and/or analyzing user submissions, service 132 can reduce the risk that a user's private information (e.g., the user's movements, behaviors, habits, etc.) will be exposed to external malicious actors.

In some implementations, submission collection module 134 can store received and/or validated user submissions in received submissions database 142. For example, received submission database 142 can store receive traffic incident reports, POI ratings, online marketplace ratings (e.g., product ratings, vendor ratings, etc.) and/or any other type of user submissions. Submission collection module 134 can store all received user submissions in received submissions database 142.

In some implementations, received submissions database 142 can store received submissions for a period of time and then delete the user submissions. For example, received submissions database 142 can store user submissions indefinitely (e.g., forever). Received submissions database 142 can store user submissions for a defined period of time (e.g., 7 days, 10 days, 1 month, etc.). Received submissions database 142 can store user submissions until the user submissions are processed by fraud detection module 136, described below. For example, after fraud detection module 136 has analyzed the received user submissions to determine whether the submissions are related to fraudulent user activity, fraud detection module 136 can mark the user submissions as processed and cause received submissions database 142 to delete the processed user submissions.

In some implementations, service 132 can include fraud detection module 136. As described above, some malicious users may submit traffic incident reports, POI reviews, marketplace reviews, and/or other data with the intent to fraudulently influence the behavior of other users. Some malicious users may organize and work together as groups (e.g., fraud rings) to fraudulently influence the behavior of other users to negatively, or positively, impact traffic patterns, POI ratings, marketplace ratings, etc. Fraud detection module 136 can be configured to analyze user submissions (e.g., stored in received submissions database 142) to reject, block or flag submissions from users with low credibility, generate credibility scores for submitting users, and/or identify potential fraud rings based on the impact these fraud rings have on their targets (e.g., traffic patterns in a specific geographic area, point of interest, products, vendors, etc.), as described further below.

In some implementations, fraud detection module 136 can store user submissions that have been identified as suspicious submissions in suspicious submissions database 140. For example, fraud detection module 136 can identify suspicious user submissions related to a fraud ring, or other fraudulent user activity and store the suspicious user submissions in suspicious submissions database 140. The suspicious user submissions in suspicious submissions database 140 can then be analyzed (e.g., manually, automatically, etc.) to determine whether the suspicious submissions are related to fraudulent user activity (e.g., individual user activity and/or user group activity).

In some implementations, fraud detection module 136 can store data related to user credibility and/or user groups in user data database 138. For example, user data database 138 can store user data and/or user group data using anonymous (e.g., surrogate) user identifiers generated by service 132 for each submitting user. For example, user data database 138 can store user data generated by service 132 for each submitting user, such as a credibility score for each user, user groups with which the user has been associated, group impact scores for each user group, and/or other user credibility data, as may be described herein.

Figure 2:
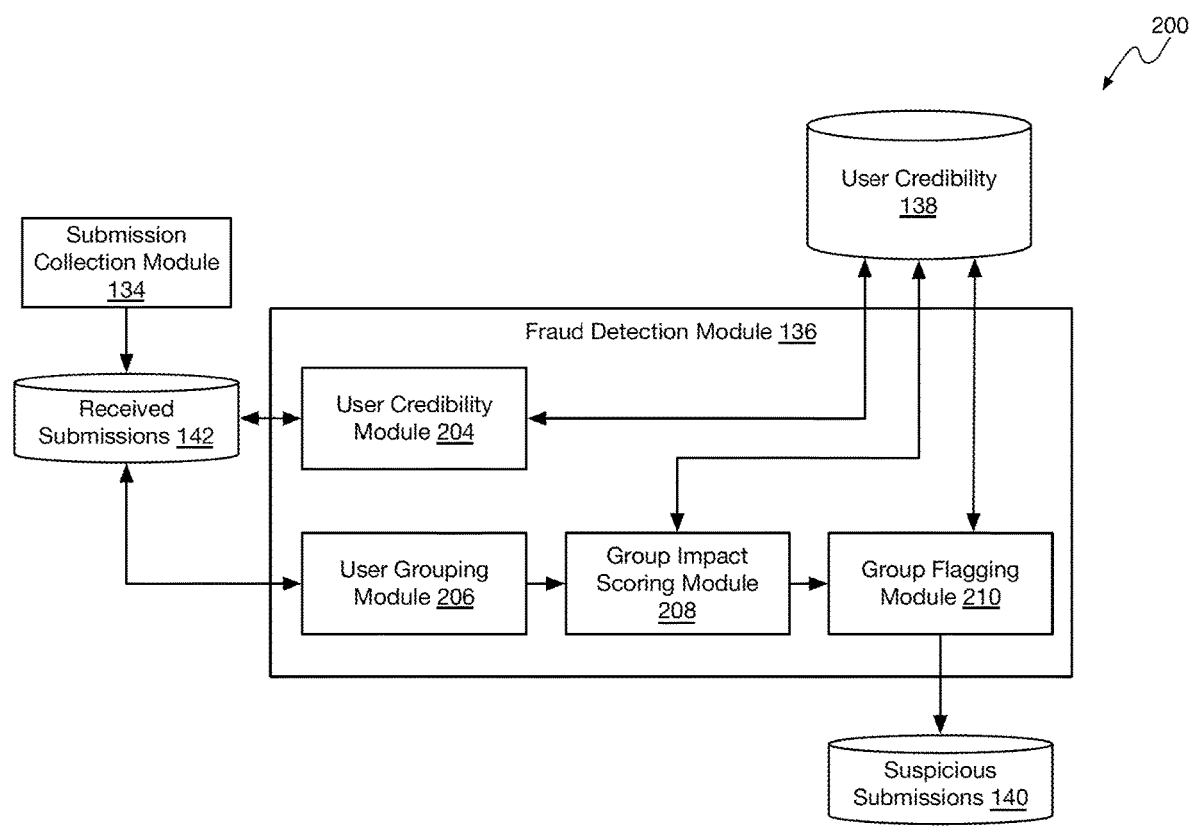
FIG. 2 is a block diagram of an example system configured for impact-based fraud detection.

FIG. 2 is a block diagram of an example system 200 configured for impact-based fraud detection. For example, system 200 can correspond to system 100, described above. System 200 is specifically focused on the fraud detection aspects of the technology disclosed herein. For example, system 200 illustrates an example implementation of fraud detection module 136, described above.

In some implementations, fraud detection module 136 can receive a user submission from submission collection module 134. As described above, submission collection module can validate the user account associated with the user submission and replace the user identifying information (e.g., user account, device identifier, etc.) with an internally generated surrogate identifier for the user. For example, server device 130, service 132, and/or some other software and/or hardware may store a mapping that maps user account information to surrogate identifiers so that a particular surrogate identifier can be mapped to the same user account with each submission from the user account. The mapping of surrogate identifiers to user account identifiers can be stored separately from the user submissions so that the user submissions cannot be readily traced back to a particular user, user account, or user device, should the user submission information be exposed to external, malicious actors. Thus, when fraud detection module 136 receives user submissions, the user identifying information in the user submissions have already been replaced by the more anonymous surrogate identifiers. For example, the surrogate identifiers can be used to determine that different submissions belong to the same user but may not be used to identify the submitting user without the surrogate identifier to user account identifier mapping which is stored separately from the user submissions and/or user credibility data.

In some implementations, fraud detection module 136 can include user credibility module 204. For example, user credibility module 204 can analyze user submissions in received submission database 142 to determine which user submissions to accept as credible and which submissions to reject (e.g., delete, flag, block, etc.). For example, user credibility module 204 can reject user submissions that do not meet various criteria for trustworthiness so that the user submissions are not considered when service 132 generates traffic incident notifications, POI ratings, and/or marketplace ratings for presentation to end users. For example, user credibility module 204 store data in received submissions database 142 (e.g., store data in the submission record in submissions database 142) identifying rejected user submission so that the rejected submissions can be recognized by other modules as being rejected and/or suspicious user submissions that should not be considered when determining whether traffic incidents exist, or when determining ratings of POIs and/or marketplace products and/or vendors.

In some implementations, user credibility module 204 can reject user submissions associated with surrogate identifiers having corresponding credibility scores below a threshold credibility score. For example, each surrogate identifier (e.g., each user) associated with a user submission (e.g., traffic report, POI review, marketplace review, etc.) can have a corresponding credibility score. The credibility score can, for example, range from zero (e.g., no credibility) to 1 (e.g., highly credible). New users may start at a credibility score of one half (e.g., 0.5) indicating that the credibility of the user is unknown. As the user's submissions are evaluated by fraud detection module 136, the user's credibility score can be adjusted to reflect the credibility (e.g., how credible, reliable, trustworthy, etc.) of the user. When a user submission is received by user credibility module 204, user credibility module 204 can obtain the user credibility score corresponding to the surrogate identifier associated with the user submission from user credibility database 138. If the user's credibility score is below a threshold value (e.g., below 0.2, below 0.1, etc.), then user credibility module 204 may reject the user's submission and identify the user submission as rejected in received submissions database 142.

In some implementations, user credibility module 204 can reject user submissions based on location. For example, a received user submission can identify the location of the user device when the submission was generated and identify the location of the traffic incident, POI, or other submission target. User credibility module 204 can compare the location of the user device (e.g., as proxy for the location of the user) to the location of the submission target (e.g., traffic incident, POI, etc.) to determine whether the user could have been at the location of the submission target (e.g., the location of the traffic incident, POI, etc.). For example, a user who is 200 miles away from the location of a traffic incident could not be an eyewitness to the traffic incident. Thus, in some implementations, if the user's location identified in the user submission is greater than a threshold distance away from the location of the submission target, then user credibility module 204 may reject the user's submission and identify the user submission as rejected in received submissions database 142.

In some implementations, user credibility module 204 may not reject user submissions based on location and/or distance. For example, a location estimate for a user device may be a low accuracy estimate and therefore cause the user device to appear to be farther away from the submission target than it really is. User credibility module 204 can determine that the location estimate is a low accuracy estimate (e.g., based on user device location data in the user submission) and either delete the corresponding user submission from received submission database 142 or not reject the user submission based on location/distance.

In some implementations, user credibility module 204 can reject duplicative user submissions. For example, a user may attempt to make multiple submissions related to a single target (e.g., traffic incident, POI, product, vendor, etc.) in order to influence other users' behavior related to the single target. User credibility module 204 can identify duplicative user submissions when the user account identifier, device identifier, time, location, type, category, name, and/or description provided in the user submission are identical or nearly identical. When user credibility module 204 identifies a duplicative submission, user credibility module 204 can reject the duplicative submission and identify the user submission as rejected in received submissions database 142.

In some implementations, user credibility module 204 may not reject user duplicative user submissions. For example, a user may unintentionally send duplicate submissions if there has been some technical difficulty on the client device. Thus, in some implementations, user credibility module 204 can delete the duplicative user submission from received submissions database 142 rather than store the user submission, mark it as rejected, and allow the duplicative user submission to negatively impact the user's credibility score.

In some implementations, user credibility module 204 can reject user submissions based on other users' submissions related to the same target. For example, when a user submits a traffic incident report indicating a traffic accident at a particular location, other users may also submit traffic incident reports indicating the presence or absence of a traffic accident at the particular location. Each user submission related to the traffic incident can be considered a vote for or against the traffic accident. If user credibility module 204 determines that more users have voted that the traffic incident exists than voted that the traffic incident does not exist, then user credibility module 204 can determine that the traffic incident exists. If user credibility module 204 determines that more users have voted that the traffic incident does not exist than voted that the traffic incident does exist, then user credibility module 204 can determine that the traffic accident does not exist.

In some implementations, individual user votes can be weighted based corresponding credibility scores for the voting user. For example, each voting user can have one vote (e.g., for or against a traffic incident) but the user's vote can be weighted based on the user's credibility score. If a user has a credibility score of 0.2, then the user's vote can be counted as 0.2 (e.g., 1*0.2=0.2). Thus, if three votes are received that suggest a particular traffic incident exists where each voting user has respective credibility scores of 0.2, 0.3, and 0.4, then the probability that the traffic incident exists can be determined by calculating the average of the votes resulting in a probability of 0.3 (e.g., (0.2+0.3+0.4)/3=0.3) that the traffic accident exists. Similarly, if three votes are received that suggest a particular traffic incident does not exist where each voting user has respective credibility scores of 0.6, 0.7, and 0.9, then the probability that the traffic incident does not exist can be determined by calculating the average of the votes resulting in a probability of 0.3 (e.g., (0.6+0.7+0.9)/3=0.73) that the traffic accident does not exist. Since the probability that the traffic incident does not exist (e.g., 0.73) is greater than the probability that the traffic incident does exist (e.g., 0.3), user credibility module 204 can determine that the traffic incident does not exist.

In some implementations, user credibility module 204 can determine the results of a vote (e.g., a determination of whether or not the traffic incident exists) using a Bayesian Network. For example, a Bayesian Network can be used to calculate the probability that a particular incident exists based on the votes (e.g., traffic incident reports) received for the particular incident and/or the user credibility scores for the reporting/voting users. An example formula for the Bayesian Network can be defined by the formula P(Incident|UserVote1, Incident|UserVote2, . . . , Incident|UserVoteN)=P(Incident) P(UserVote1|Incident)*P(UserVote2|Incident)* . . . P(UserVoteN|Incident). For example, the probabilities associated with each user vote can correspond to the user's credibility score. Using the formula above, user credibility module 204 can calculate the likelihood of whether the traffic incident is present or absent. If the Bayesian Network produces a probability that indicates the traffic incident likely exists, then user credibility module 204 can determine that the traffic incident exists. If the Bayesian Network produces a probability that indicates the traffic incident likely does not exist, then user credibility module 204 can determine that the traffic incident does not exist.

In some implementations, user credibility module 204 can reject user submissions based on a comparison of the user's submission to a verification source. For example, in the context of a navigation service, service 132 may collect probe data (e.g., location data, movement data, etc.) from user devices (e.g., user device 110) that can be used to determine or derive traffic movements in various areas. For example, the probe data can be used to determine what the traffic movements are in a geographic area. When users submit traffic incident reports related to a traffic accident, user credibility module 204 can determine whether the traffic accident exists based on the user votes, as described above. User credibility module 204 can also compare the result of the votes (e.g., the determination that the traffic accident exists or does not exist) with the probe data (e.g., the verification source) to verify whether or not the traffic accident exists. If the probe data does not correspond to the result of the user votes, then the user submissions related to the traffic accident can be flagged for manual review, in suspicious submissions database 140.

When the probe data corresponds to the result of the user votes (e.g., the probe data matches or confirms the result of the votes), then the credibility scores for each user who submitted a vote can be adjusted. For example, the user's credibility score can be a ratio of accepted submissions over total submissions (e.g., accepted/total=credibility score). When the probe data corresponds to the result of the users votes, the user submissions that correspond to the probe data can be accepted while the user submissions that do not correspond to the probe data can be rejected. Since the user's credibility score is a ratio of accepted submissions versus total submissions, a rejected submission can cause the user's credibility score to go down while an accepted submission can cause the user's credibility score to go up. The user's credibility score can be calculated in response to receiving a submission from the user. The user's credibility score can be calculated in response to determining whether to accept or reject a user's submission. For example, a user submission can be rejected as a result of voting, low credibility score, location, duplicate submissions, etc., as described above. All of these rejected submissions can trigger a recalculation of the user's credibility score and negatively impact the user's credibility score. The user's credibility score can be calculated on a periodic basis (e.g., every 24 hours, every 7 days, etc.). The credibility score for a user (e.g., associated with a surrogate identifier) can be stored in user credibility database 138 in association with the surrogate identifier each time the credibility score is calculated. For example, user credibility database 138 can store for each surrogate identifier a credibility score and counts of accepted submissions, rejected submissions, and/or total submissions, among other user data described herein.

In some implementations, fraud detection module 136 can include user grouping module 206. For example, in order to identify malicious users who have organized to work together to fraudulently impact traffic patterns, POI ratings, product ratings, and/or vendor ratings (e.g., fraud rings), user grouping module 206 can be configured to identify user groups that submit traffic incident reports, POI ratings, product ratings, and/or vendor ratings, as illustrated by FIG. 3.

Figure 3:
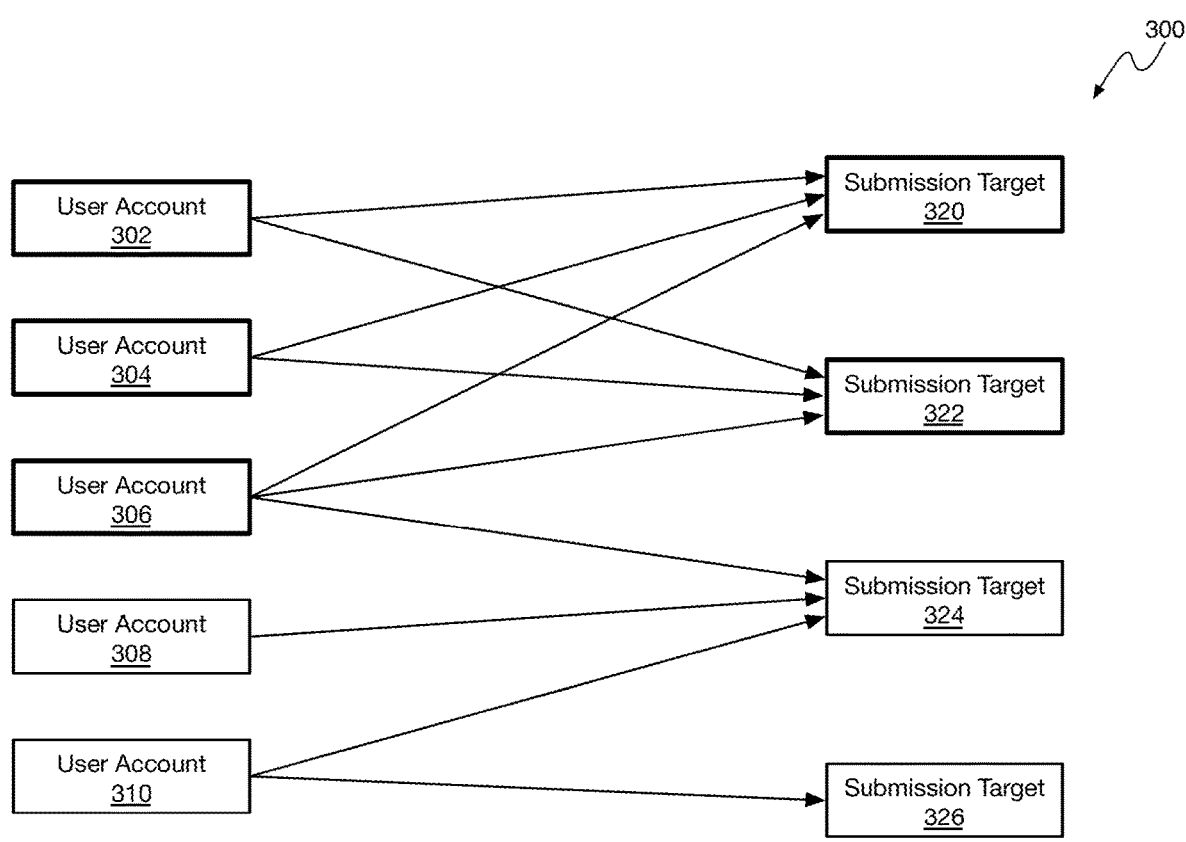
FIG. 3 is an illustration depicting identifying user groups based on user submissions.

FIG. 3 is an illustration 300 depicting identifying user groups based on user submissions. For example, illustration 300 shows user accounts 302-310 (e.g., identified by surrogate identifiers in received submissions database 142) that have submitted incident reports, ratings, etc. related to submission targets 320-326. Each submission target 320-326 can correspond to a respective traffic incident, POI, product, or vendor, for example. For simplicity, user group identification will be discussed with reference to traffic incidents, however the description that follows may also apply to points of interest reviews, product reviews, vendor reviews, and/or other user submissions.

In some implementations, user grouping module 206 can identify user groups based on various criteria related to the user submissions. In some implementations, the user grouping criteria can include time range limitations for considering user submissions for grouping. For example, the time range can be unlimited so that user grouping module 206 can consider all user submissions for all time. However, to reduce the amount of data that must be stored, the processing power required, and/or the processing time required, the time range can be limited to a sliding window of time. For example, only user submissions received in the previous 7 days, the previous 2 weeks, the previous month, etc., may be considered for user grouping purposes.

In some implementations, the user grouping criteria can include geographic area limitations for considering user submissions for grouping. For example, the geographic area can be unlimited so that user grouping module 206 can consider all user submissions related to all geographic areas for grouping purposes. However, to reduce the amount of data that must be stored, the processing power required, and/or the processing time required, the geographic area can be limited. For example, only user submissions related to targets that are located within a state, city, or other geographic area (e.g., within a 10-mile radius) may be considered for user grouping purposes. In some implementations, the locations of the users may be considered for grouping purposes. For example, only user submissions related to users who are located within the same state, city, or other geographic area (e.g., within a 10-mile radius) may be grouped together.

In some implementations, the user grouping criteria can include target category limitations for considering user submissions for grouping. For example, target categories can be traffic incidents, POI reviews, product reviews, and/or vendor reviews. Target categories can relate to the type of traffic incidents reported. For example, traffic incident categories can include police locations, traffic jams, accidents, construction, etc. POI review categories can include POI types, such as restaurants, bars, parks, entertainment venues, etc. Product categories can include product types, such as home and garden, tools, exercise equipment, etc. The target categories can be unlimited so that user grouping module 206 can consider all user submissions related to all target categories for grouping purposes. However, to reduce the amount of data that must be stored, the processing power required, and/or the processing time required, the user grouping can be limited to grouping within target categories, and not across different categories. For example, only user submissions related to the same category of target may be considered for user grouping purposes. Thus, if a first user and a second user submit POI reviews related to restaurants, then the first user and the second user may be grouped into a user group. However, if a third user submits a POI review related to a park (e.g., a different category than restaurant), then the third user may not be grouped with the first user or the second user, unless the first user and/or the second user also submit a POI review related to a park.

In some implementations, the user grouping criteria can include a minimum group size and a minimum number of submissions for a user group. For example, user grouping module 206 can identify a user group by determining when the same group of users have provided submissions for a minimum threshold number of targets. Since a user group requires more than one user, the minimum size for a user group may be a minimum threshold number of two or more. However, a small user group may not have the impact that a larger user group may have. Since the technology described herein prioritizes user groups for review to identify fraud rings (e.g., malicious groups of users who provide fraudulent submissions) based on impact, increasing the minimum group size to a number larger than two may result in a more efficient process for identifying fraud rings since a larger user group will typically have a greater impact than a smaller user group. Additionally, user groups cannot be identified based on a single submission because a single submission may just be associated individual users who may have happened to provide submissions for the same target. To identify a user group that works together, user grouping module can identify multiple submissions by the same group of people. Thus, in an example, user grouping module 206 may be configured with a minimum group size (e.g., 3 users) and a minimum number of submissions (e.g., 2) for identifying a user group.

Referring to the example of FIG. 3, user accounts 302-310 have provided submissions related to submission targets 320-326. User grouping module 206 can apply the grouping criteria described above (e.g., time range criteria, geographic area criteria, category criteria, minimum group size, minimum number of submissions, etc.) to identify user groups amongst the user accounts 302-310. In the example of FIG. 3, user grouping module 206 can be configured with a minimum group size of 3 and 2 as the minimum number of submissions for a group. Applying these criteria to the user accounts and submissions of FIG. 3, user grouping module 206 can determine that user account 302, 304, and 306 have provided submissions related to submission target 320. User grouping module 206 can also determine that user account 302, 304, and 306 have provided submissions related to submission target 322. Thus, since this group of 3 user accounts (e.g., user account 302, 304, and 306) have provided submissions related to at least two submission targets (e.g., targets 320 and 322), user grouping module 206 can identify user accounts 302, 304, and 306 as a user group. With respect to submission target 324, user grouping module 206 can determine that user account 306, user account 308, and user account 310 have provided submissions to submission target 324. With respect to submission target 326, user grouping module 206 can determine that user account 308 and user account 310 have provided submissions to submission target 324. User accounts 308 and 310 have both provided submissions related to submission targets 324 and 326 satisfying the minimum number of submissions criterion, however, since there are only two user accounts and not 3 in this potential grouping, user accounts 308 and 310 will not be grouped. Therefore, in this example, based on the minimum group size criterion (e.g., 3 user accounts) and the minimum number of submissions criterion (e.g., 2 submissions), user grouping module 206 may only identify one user group that includes user accounts 302, 304, and 306.

Referring back to FIG. 2, after identifying the user groups, user grouping module 206 can store data mapping user groups to user accounts (e.g., using surrogate identifiers) in user credibility database 138. Thus, each user account in user credibility database 138 can be mapped to a credibility score for the user account, the number of accepted submissions, the total number of all submissions received from the user account, and to the various user groups (e.g., one or more user groups having different user accounts as constituents) with which the user account is associated.

In some implementations, fraud detection module 136 can include group impact scoring module 208. For example, after the user groups have been identified by user grouping module 208, group impact scoring module 208 can determine the impacts of the submissions of the user groups on or with respect to the submission targets. For example, when the submission target is a traffic incident, the impact of the submissions by a group can be determined based on the duration of the impact (e.g., how long traffic was effected by the group's incident reports), the number of vehicles affected, how many road segments were affected (e.g., current road segment usage versus historical normal), and/or road segment category (e.g., an incident report related to highways may have a bigger impact than an incident report related to a local non-highway road). These traffic related impact measurements can be determined based on probe data (e.g., location data reported by client devices) received by service 132, for example. The measurements determined based on the probe data at, or near, the time of the reported incident can be compared to historical probe data to determine the impact of the groups traffic incident submissions. For example, if a group submits a traffic incident report that causes 20% of the vehicles travelling on a highway to divert to nearby surface streets, then the impact of the group's traffic incident report related to number of vehicles affected is 20%.

When the submission target is a point of interest (e.g., a restaurant, entertainment venue, business, etc.), the impact of the submissions by a group can be determined based on how much the group's rating submissions effected the ratings of the POI. Thus, if the current rating of a restaurant is 80% and the group's rating submissions (e.g., star rating, description, photographs, etc.) have increased or decreased the restaurant's rating by a certain percentage (e.g., increased by 5%, 10%, 13%, etc.), then the group's impact on the restaurant can be determined to be that certain percentage.

In some implementations, a user group's impact can be calculated across multiple submission targets. For example, a user group may submit multiple different traffic incident reports for a geographic area over time in an effort to influence or impact traffic patterns in a geographic area. A user group may submit multiple different POI reviews for different points of interest (e.g., restaurants, bars, other businesses, etc.) over time in an effort to influence or impact users who may visit those POIs. For example, in order to prop up a new restaurant in a city, the owner of the restaurant may organize a group of users to submit reviews critical of other restaurants (e.g., other restaurants in the same category) in the city. As described above, user grouping module 206 can determine that this user group has provided multiple submissions with respect to multiple submission targets. Group impact score module 208 can determine the groups impact with respect to each submission target generate an overall impact score that represents the user group's impact across multiple submission targets.

In some implementations, group impact scoring module 208 can generate an overall impact score for the user group by summing (e.g., adding, totaling, etc.) the group's impact across the multiple submission targets. For example, the user group can submit ratings for restaurants A, B, and C having a current rating of 80%, 70%, and 60%, respectively. Group impact scoring module 208 can determine that the impact of the user group's submissions is a rating decrease of 5% for restaurant A, a rating decrease of 10% for restaurant B, and a rating decrease of 30% for restaurant C. By summing the impact the user group has across all submission targets (e.g., restaurant A, B, C), group impact scoring module 208 can determine an overall impact score for the user group. For example, the overall impact score for the user group described above can be estimated at 45% by summing the impact (e.g., the magnitude, the absolute values, unsigned values of the individual target impact scores) the user group has on each submission target (e.g., 5%+10%+30%=45%). For example, for the purposes of calculating impact, positive or negative impact may not be important however the magnitude of the impact is important.

In some implementations, group impact scoring module can calculate the overall impact score of the user group on a per user basis. For example, the overall impact score can be calculated as the sum of individual submission target impact scores for the user group divided by the number of members in the user group. Thus, using the example above, group impact scoring module 208 can determine that the impact of the user group's submissions is a rating decrease of 5% for restaurant A, a rating decrease of 10% for restaurant B, and a rating decrease of 30% for restaurant C. The overall impact score for the user group having 5 users on a per user basis can be estimated at 9% by summing the impact (e.g., the magnitude, the absolute values, unsigned values of the individual target impact scores) the user group has on each submission target and dividing by the number (e.g., 5) of members in the user group (e.g., (5%+10%+30%)/5=9%).

In some implementations, group impact scoring module 208 can generate an overall impact score for the user group by averaging the group's impact across the multiple submission targets. Thus, for example, the user group can submit ratings for restaurants A, B, and C having a current rating of 80%, 70%, and 60%, respectively. Group impact scoring module 208 can determine that the impact of the user group's submissions is a rating decrease of 5% for restaurant A, a rating decrease of 10% for restaurant B, and a rating decrease of 30% for restaurant C. By averaging the impact the group has across all submission targets (e.g., restaurant A, B, C), group impact scoring module 208 can determine an overall impact score for the user group. For example, the overall impact score for the user group described above can be estimated at 15% by averaging the impact (e.g., the magnitude, the absolute values, unsigned values of the individual target impact scores) the user group has on each submission target (e.g., (5%+10%+30%)/3=15%).

In some implementations, a user group's impact score can be stored in user credibility database 138. For example, group impact scoring module 208 can store all impact scores generated for all submissions received from a group of users so that a group's overall impact score can be recalculated when new submissions are received and new impact scores are generated for a group. Group impact scoring module 208 can store score the overall impact score (e.g., the average score) for a group and a total number of submissions so that the average may be recalculated with new submissions are received and new impact scores are generated for a group. The impact score data for a user group can be stored in association with the user group in user credibility database 138. For example, a user group can be associated with a user group identifier. The user group identifier can be associated with the user accounts that are constituents of the user group. The user group identifier can be associated with the impact scores generated for the user group.

In some implementations, fraud detection module 136 can include group flagging module 210. For example, group flagging module 210 can be configured to identify potential fraud rings from the user groups identified by user grouping module 206 based on the impact scores generated by group impact scoring module 208. For example, group flagging module 210 can obtain user group information, including user group membership and user group impact scores from user credibility database 138. Group flagging module 210 can determine the highest impact user groups based on the overall group impact scores for each user group. For example, group flagging module 210 can sort the user groups based on the overall group impact scores for each user group and select a number (e.g., top 5, top 10, top 20%, etc.) of the user groups having the highest overall impact scores to flag as suspicious user groups.

In some implementations, group flagging module 210 can select the user groups that correspond to overall impact scores that are high score statistical outliers relative to other user groups. For example, group flagging module 210 can identify and/or select user groups that are high impact score outliers using any one of various known outlier detection methods, such as z-score method, probabilistic and statistical modeling, linear regression, or any other outlier detection method. The user groups that have overall impact scores that are high score outliers relative to other user groups can be flagged as suspicious user groups. Group flagging module 210 can store information identifying these suspicious user groups in suspicious submissions database 140. For example, group flagging module 210 can store for each suspicious group, a group identifier, corresponding impact scores, user identifiers (e.g., surrogate identifiers), user credibility scores, etc.

In some implementations, suspicious user groups stored in suspicious submissions database 140 can be analyzed to determine whether the suspicious user groups correspond to fraud rings. For example, the analysis of the user groups stored in suspicious submissions database 140 can be a manual process where an administrator user reviews the information in suspicious submissions database and determines whether the user's associated with a user group have made fraudulent submissions. If the users of a user group (e.g., fraud ring) have made fraudulent submissions, the credibility score for each member of the fraud ring can be set to zero in user credibility database 138 thereby preventing these users from fraudulently impacting submission targets (e.g., traffic, POIs, products, vendors, etc.) in the future.

In some implementations, suspicious user groups stored in suspicious submissions database 140 can be analyzed to determine whether the suspicious user groups correspond to fraud rings based on spam rules defined for service 132. For example, service 132 can compare the number of submissions received from users associated with suspicious user groups to determine if there has been a sudden increase in submissions from the group. A sudden increase in submissions can indicate that the user group may be trying to fraudulently impact a submission target (e.g., traffic, POI, vendor, product, etc.). Thus, service 132 may determine that a user group is a fraud ring based on the sudden increase in submissions from the user group. Service 132 may determine that a user group is a fraud ring based on the age of the user account. For example, new user accounts (e.g., less than a threshold number of days, weeks, years, etc.) are more likely to be fraudulent or engage in fraudulent activity that older, more established accounts. Service 132 may determine that a user group is a fraud ring based on the submissions received from the users in the user group over a period of time. For example, a dedicated user is typically active for a sustained period of time and submits reports and/or ratings that are closer to other users for a given location compared to a fraudulent user.

Service 132 can determine that a user group is a fraud ring by determining that a user account within the user group has made submissions from multiple different user devices. For example, the user may be attempting to make the user submissions appear to come from different users by originating user submissions from different devices. Service 132 can determine that a user group is a fraud ring by determining that a user account within the user group has logged in and out of service 132 multiple times when providing multiple user submissions. For example, each time the user account logs in to service 132, service 132 may generate a token that the user account on the user device can use to access service 132 and/or submit traffic incident reports, POI ratings, etc. By logging in and out of service 132 and generating new/different tokens, the user may be trying to make duplicate submissions associated with different tokens appear to be originated by different user accounts or different users. When the user group and/or user accounts associated with the user group are determined to be fraudulent or engaging in fraudulent submissions, service 132 may set the user credibility scores for these users to zero thereby preventing these users from impacting submission targets in the future.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 4:
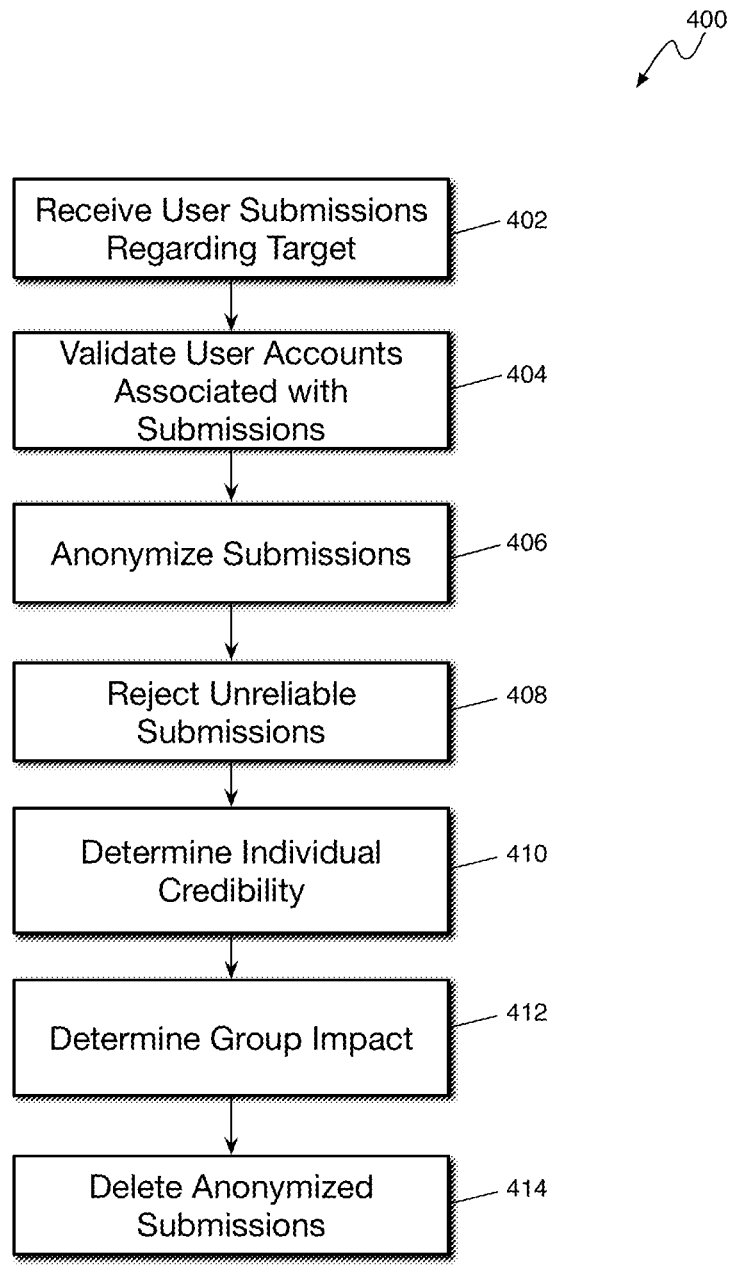
FIG. 4 is flow diagram of an example process for impact-based fraud detection.

FIG. 4 is flow diagram of an example process 400 for impact-based fraud detection. For example, process 400 can be performed by server device 130 to determine user credibility and/or fraudulent activity related to various user submissions.

At step 402, server device 130 can receive user submission regarding a target. For example, the target can be a traffic incident (or traffic in general), a POI, a product, a vendor, or anything else that may be the subject of a user submission. Server device 130 can receive user submissions from multiple different user devices associate with multiple different user accounts. Server device 130 can use the user submissions to make crowd-sourced determinations related to the existence of traffic incidents, POI ratings, product ratings, vendor ratings, and/or other user reported data.

At step 404, server device 130 can validate user accounts associated with the received submissions. For example, user submissions can include user account identification information and/or user device identification information. Server device 130 can, for example, validate a user account identifier included in the user submission to determine whether the user account identifier is associated with a user account registered and/or active with a service hosted by or associated with server device 130. In some cases, server device 130 can validate a user account and/or user submission by comparing a combination of user account identifier and device identifier with user account information and user device information associated with a registered user account. In some cases, server device 130 can validate a user account and/or user submission based on a validation and/or authorization token received in the user submission that was previously provided to the user or user device submitting the user submission. When the user account associated with the user submission cannot be validated, server device 130 can delete the user submission without further processing. When the user account associated with the user submission is validated, server device 130 can proceed to step 406 of process 400.

At step 406, server device 130 can anonymize the received user submissions. For example, server device 130 can anonymize the received user submission by replacing the user account identification information received in the user submission with a surrogate (e.g., proxy, anonymous, etc.) identifier. After anonymizing the received user submissions, server device 130 can store the anonymized user submissions in received submissions database 142, for example.

At step 408, server device 130 can reject unreliable submissions. For example, server device 130 can reject user submissions from user accounts (e.g., as identified by surrogate identifier) having credibility scores below a threshold value. Server device 130 can reject user submissions where the distance between the location of the user device submitting the user submission and the location of the submission target is greater than a threshold distance. Server device 130 can reject user submissions where the user submission is determined to be a duplicate of a previous user submission.

At step 410, server device 130 can determine individual user credibility related to user submissions. For example, server device 130 can determine user credibility related to a user submission by comparing the user submission to other user submissions received from other users. For example, each user submission can be counted as a vote for or against an assertion made in a traffic incident report, POI rating, product rating, vendor rating, etc. In some implementations, server device 130 can determine the truth of the assertion based on the votes, as described above. For example, when more user submissions assert that a traffic incident exists than user submissions that assert that a traffic incident does not exist, server device 130 can determine that the traffic incident exists. When more user submissions assert that a POI is open for business than user submissions that assert that the POI is permanently closed, server device 130 can determine that the POI is open for business.

In some implementations, server device 130 can compare the results of user votes to a verification source. For example, for traffic incident report submissions, traffic probe data can be used to verify whether or not a traffic incident exists. For POI related submissions, a separate business directory or other reliable database can be used to verify, for example, whether a POI is still operating or not, the POI hours of operations, or other data related to the POI, if verifiable. When the result of the user votes can be confirmed based on verification data from the verification source, the user credibility scores for each voting user can be updated to reflect which users provided reliable user submissions and which users did not, as described above. If a verification data is not available for the user submissions, the user submissions can be flagged for manual review and user credibility scores can be updated based on the results of the manual review. After updating user credibility scores, server device 130 can store the updated user credibility scores and/or associated data in user credibility database 138.

At step 412, server device 130 can determine the impact of user groups with respect to submission targets. For example, server device 130 can analyze user submissions to identify user groups and generate impact scores for the user groups, as described above. Server device 130 can flag the user groups having the highest impact scores for review to determine whether the user groups are providing fraudulent submissions to server device 130. User accounts (e.g., surrogate user identifiers) associated with fraudulent user groups (e.g., fraud rings) can have their credibility scores set to zero thereby preventing the users associated with these user groups from fraudulently impacting traffic, POIs, products, and/or vendors in the future. After generating and/or updating group impact scores, server device 130 can store the group impact scores and/or associated data in user credibility database 138.

At step 414, server device 130 can delete the anonymized user submissions. For example, after determining user credibility and/or generating group impact scores, server device 130 can delete the user submissions to avoid the risk that sensitive user information may be inadvertently disclosed to malicious third parties.

Figure 5:
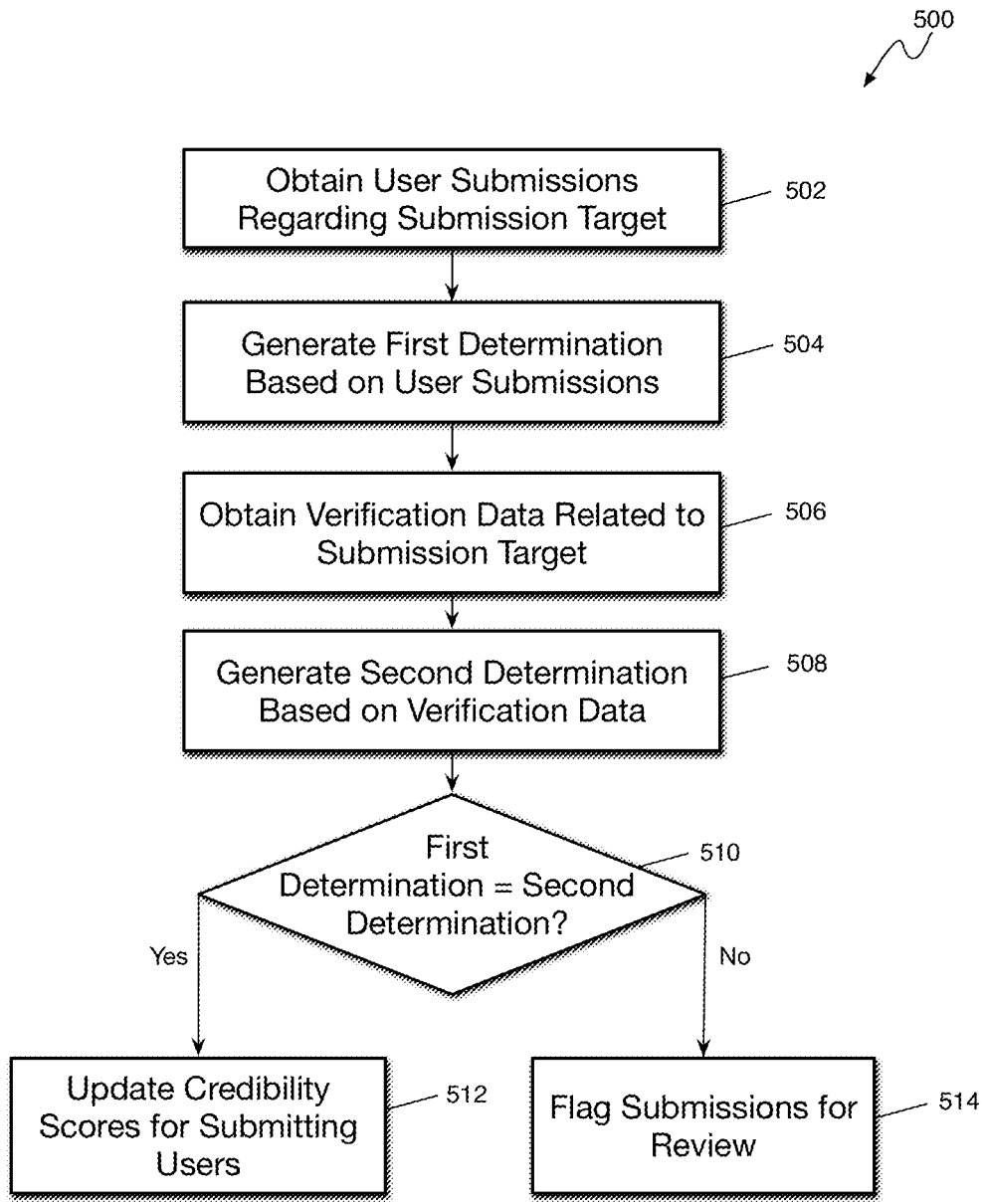
FIG. 5 is flow diagram of an example process for determining user credibility related based on user submissions.

FIG. 5 is flow diagram of an example process 500 for determining user credibility related based on user submissions. For example, process 500 can be performed by server device 130 to determine the credibility of user submissions and update individual user credibility scores. Process 500, or portions of process 500, can be performed at step 410 of process 400, for example.

At step 502, server device 130 can obtain user submissions regarding a submission target. For example, server device 130 can obtain user submissions describing a traffic incident, a POI rating, a product rating, a vendor rating, a marketplace rating, or other type of crowd-sourced information.

At step 504, server device 130 can generate a first determination based on the user submissions. For example, each user submission related to a submission target can assert a fact about the submission target. The fact can be, for example, that a traffic incident exists at a specified location, that a POI is open or closed, or any other assertion made by a user in a user submission. Each user submission related to the submission target can be considered a vote for or against the assertion made in the corresponding user submission. For example, some users may submit traffic incident reports asserting (e.g., voting) that a traffic accident exists or does not exist at a specified location. Some users may submit traffic incident reports asserting that a police checkpoint exists or does not exist at a specified location. Some user may submit a POI rating or review indicating that a business is open or closed for business. Based on the received votes, server device 130 can make a first determination whether the asserted fact in the received user submissions should be accepted (e.g., assertion is true) or rejected (e.g., assertion is false).

At step 506, server device 130 can obtain verification data related to the submission target. For example, server device 130 can obtain verification data related to the submission target from a verification source. For traffic related submissions, the verification source can be traffic probe data (e.g., crowd-sourced traffic data, crowd-sourced location data, etc.). For POI related submissions, the verification source can be an authority related to the POI or POI category. For example, a verification source for park related data can be a website or server managed by a local, state, or national park service.

At step 508, server device 130 can generate a second determination based on the verification data. For example, for traffic incident report submissions related to a particular location, server device 130 can determine based on traffic probe data the state of traffic near the particular location at about the time of the traffic incident indicated in the submitted traffic incident report. Server device 130 can, for example, determine whether traffic is abnormally slow (e.g., indicating an accident, police checkpoint, or other traffic abnormality) near the particular location based on the traffic probe data.

At step 510, server device 130 can determine whether the first determination corresponds to (e.g., matches) the second determination. For example, when verifying the result of a vote related to the existence of a traffic incident, server device 130 can compare the traffic verification data to the result of the user vote (e.g., user submissions) to determine if the result of the vote (e.g., that a traffic accident exists at a particular location) is reasonable in light of the traffic probe data (e.g., indicating that traffic has slowed at the particular location). When the result of the vote corresponds to or is supported by the verification data, at step 512, server device 130 can update the user credibility scores for the users (e.g., user accounts) who submitted the user submissions considered in the vote. When the result of the vote does not correspond to or is not supported by the verification data, at step 514, server device 130 can flag the user submissions considered in the vote for review.

At step 512, server device 130 can update user credibility scores for individual user accounts associated with the user submissions. For example, when a user submission associated with a user account is verified by the verification data (e.g., the user's assertion/vote that a traffic accident exists is supported by the traffic probe data), then the credibility score for the user account can be increased. When a user submission associated with a user account is contradicted by the verification data (e.g., the user's assertion/vote that a traffic accident exists is disproved by the traffic probe data), then the credibility score for the user account can be decreased.

At step 514, server device 130 can flag the user submissions related to an unverified vote for review. For example, server device 130 can store the user submissions in suspicious submissions database 140 for review to determine whether any of the user submissions are fraudulent.

Figure 6:
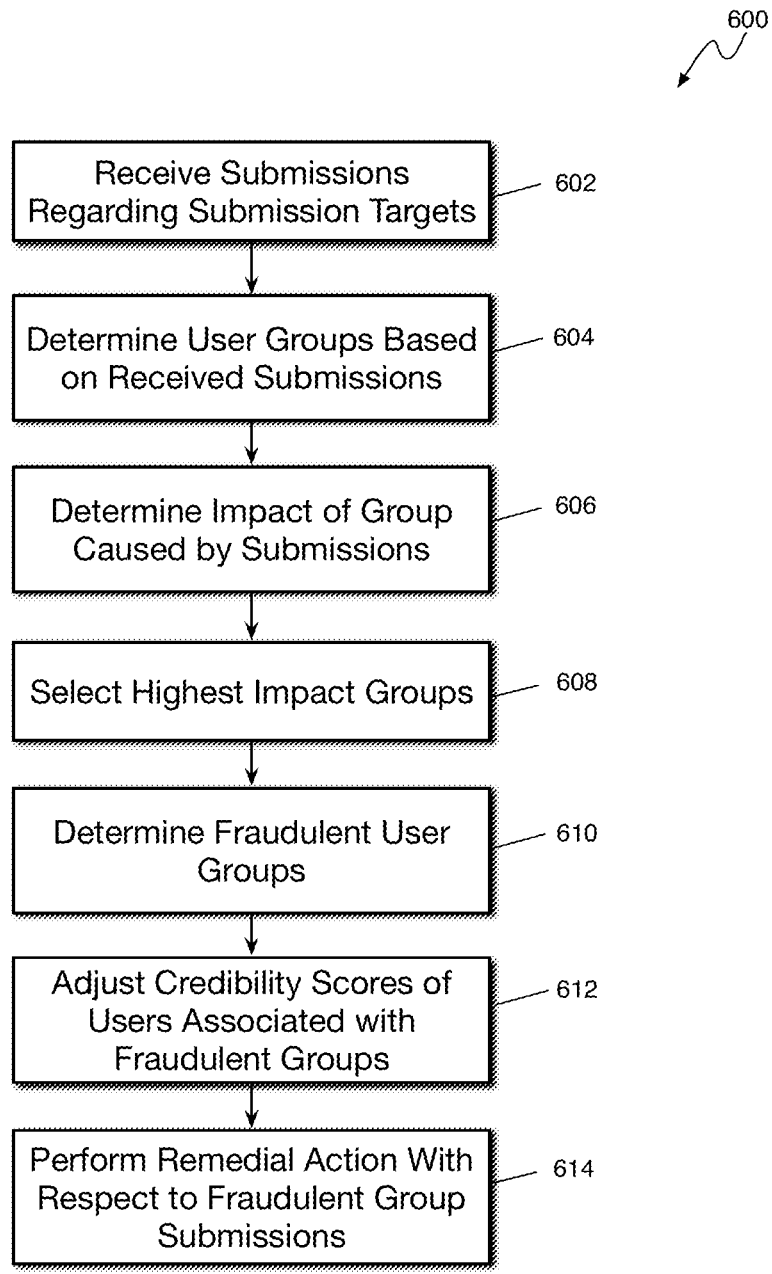
FIG. 6 is a flow diagram of an example process for identifying fraud rings.

FIG. 6 is a flow diagram of an example process 600 for identifying fraud rings. For example, process 600 can be performed by server device 130 to prioritize high impact user groups for fraud ring detection. Server device 130 can perform process 600 at step 412 of process 400, for example.

At step 602, server device 130 can receive user submissions regarding submission targets. For example, server device 130 can obtain user submissions describing a traffic incident, a POI rating, a product rating, a vendor rating, a marketplace rating, or other type of crowd-sourced information. Server device 130 can obtain the user submissions from received submissions database 142, for example.

At step 604, server device 130 can determine user groups based on received user submissions. For example, server device 130 can determine user groups based on the various grouping criteria described above, including time range, geographic area, target category, minimum group size, and/or minimum number of submissions. Server device 130 can store the determined user groups in user credibility database 138, as described above.

At step 606, server device 130 can determine impact of user groups caused by user submissions of users associated with the user groups. For example, server device 130 can determine the impact score of the submissions of user groups in relation to individual submission targets. Server device 130 can average the user group's impact across multiple submission targets to determine the overall impact score of each user group. Server device 130 can store the impact scores in user credibility database 138, as described above.

At step 608, server device 130 can select the highest impact groups. For example, server device 130 can determine the highest impact groups by sorting the user groups based on overall impact score and selecting a number of impact groups having the highest scores. Alternatively, server device 130 can select user groups based on a statistical outlier method that identifies user groups that have unusually high impact scores, as described above. Server device 130 can select the highest impact groups and flag them for further review (e.g., by placing them in suspicious submissions database 140).

At step 610, server device 130 can determine fraudulent user groups. For example, server device 130 can determine user groups (e.g., fraud rings) from among the selected highest impact groups that have provided fraudulent user submissions. Server device 130 can determine these fraud rings based on input from an administrator user indicating that a user group is a fraud ring. For example, the administrator user may manually review the submissions of the user groups having the highest overall impact scores to determine if there is evidence that the user groups are engaged in fraudulent behavior. When the administrator user determines that a user group is a fraud ring, the administrator user may provide input to server device 130 designating the user group a fraud ring. Server device 130 can determine which user groups are fraud rings based on the administrator user designation and can designate the user group as a fraud ring in user credibility database 138.

In some implementations, the determination that a user group is a fraud ring can be an automated process based on various spam rules. For example, the spam rules can indicate a variety of criteria that can be used individually or in combination for automatically identifying, determining, or detecting a fraud ring. For example, the criteria can specify that a sudden increase in the number of user submissions (e.g., number of submissions per day increases by a threshold amount or percentage) by a user group can indicate a fraud ring. The criteria can indicate that the age of user accounts associated with a user group that are less than a threshold amount of time can indicate a fraud ring. For example, if all user accounts associated with a high impact user group are new, then this may be an indication of a fraud ring. The criteria can indicate that user submissions by a user group that deviate significantly from the user submissions of other users can indicate a fraud ring. When server device 130 determines that a high impact user group is a fraud ring based on the spam rules, server device 130 can designate the user group as a fraud ring in user credibility database 138.

At step 612, server device 130 can adjust the credibility scores of users associated with fraudulent user groups. For example, server device 130 can set the credibility scores of user accounts associated with a fraud ring to zero so that subsequent submissions by these users (e.g., user accounts) will not impact corresponding submission targets.

At step 614, server device 130 can perform remedial action with respect to fraudulent group submissions. For example, server device 130 can identify fraudulent submissions (e.g., traffic incident reports, POI ratings or reviews, product reviews, vendor reviews, etc.) associated with user accounts that are members of a fraud ring and remove the fraudulent submissions so that the fraudulent submissions no longer impact the corresponding submission targets. For example, if a user associated with a fraud ring has submitted damaging ratings (e.g., negative rating, negative description, damaging photos, etc.) for a restaurant, server device 130 can find the ratings submitted by the user and delete them so that the user's submissions cannot negatively impact the restaurant.

Privacy

As described above, one aspect of the present technology is the gathering and use of data available from various sources to provide crowd-sourced traffic information, point of interest ratings, product ratings, vendor ratings, and the like. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to share user observations regarding traffic incidents and/or user opinions regarding points of interest, products, vendors, etc. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of crowd-sourced user submissions related to traffic, POIs, etc., the present technology can be configured to allow users to select to "opt in" or "opt out" of participation in the collection of personal information data during registration for services or anytime thereafter. In another example, users can select not to provide any user submissions related to traffic, POIs, etc. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user submissions can be received and processed based on non-personal information data or a bare minimum amount of personal information, such as the content being requested or submitted by the device associated with a user, other non-personal information available to the network services, or publicly available information.

Example System Architecture

Figure 7:
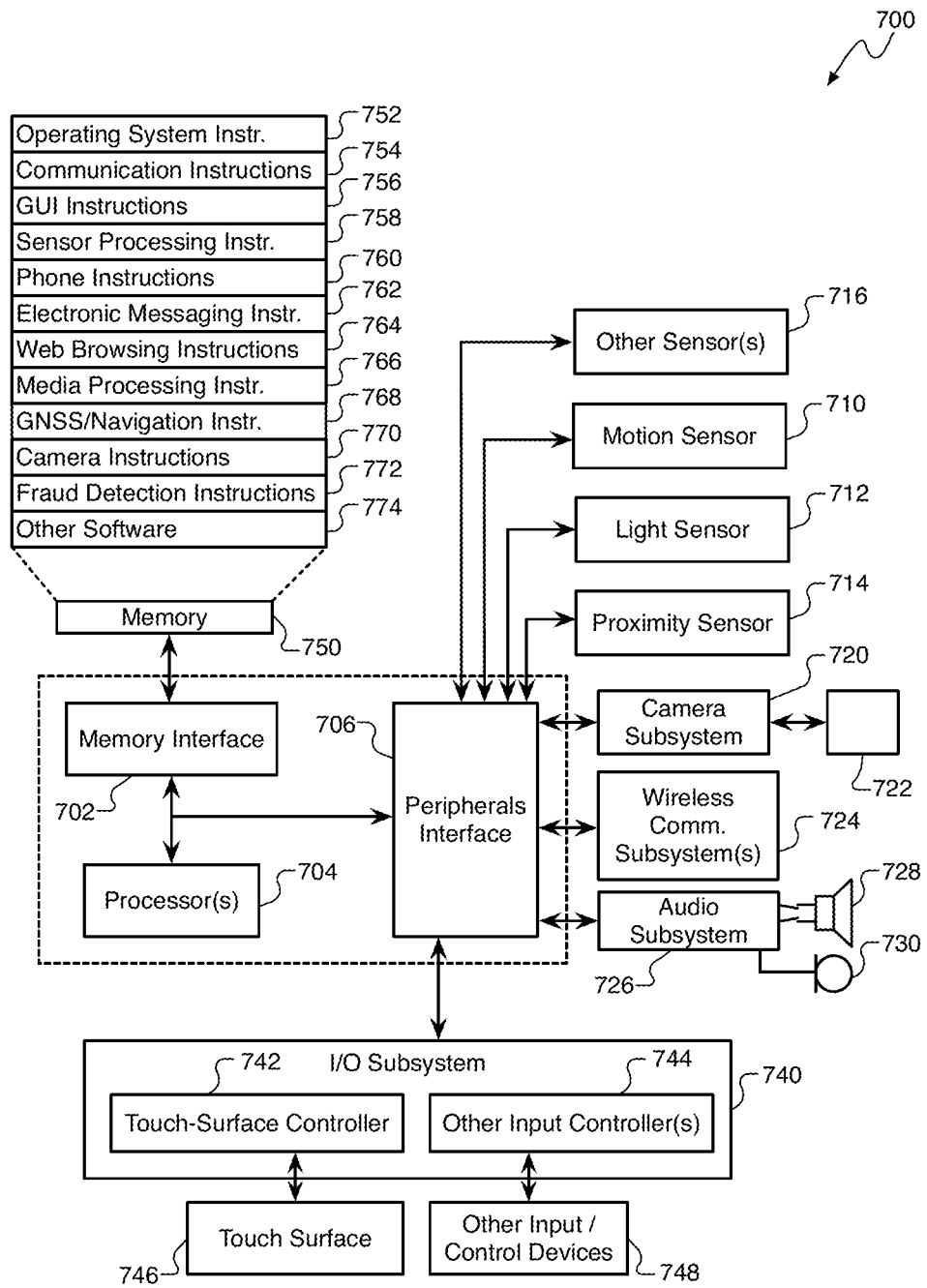
FIG. 7 is a block diagram of an example computing device that can implement the features and processes of FIGS. 1-6.

FIG. 7 is a block diagram of an example computing device 700 that can implement the features and processes of FIGS. 1-6. The computing device 700 can include a memory interface 702, one or more data processors, image processors and/or central processing units 704, and a peripherals interface 706. The memory interface 702, the one or more processors 704 and/or the peripherals interface 706 can be separate components or can be integrated in one or more integrated circuits. The various components in the computing device 700 can be coupled by one or more communication buses or signal lines.

Sensors, devices, and subsystems can be coupled to the peripherals interface 706 to facilitate multiple functionalities. For example, a motion sensor 710, a light sensor 712, and a proximity sensor 714 can be coupled to the peripherals interface 706 to facilitate orientation, lighting, and proximity functions. Other sensors 716 can also be connected to the peripherals interface 706, such as a global navigation satellite system (GNSS) (e.g., GPS receiver), a temperature sensor, a biometric sensor, magnetometer or other sensing device, to facilitate related functionalities.

A camera subsystem 720 and an optical sensor 722, e.g., a charged coupled device (CCD) or a complementary metal-oxide semiconductor (CMOS) optical sensor, can be utilized to facilitate camera functions, such as recording photographs and video clips. The camera subsystem 720 and the optical sensor 722 can be used to collect images of a user to be used during authentication of a user, e.g., by performing facial recognition analysis.

Communication functions can be facilitated through one or more wireless communication subsystems 724, which can include radio frequency receivers and transmitters and/or optical (e.g., infrared) receivers and transmitters. The specific design and implementation of the communication subsystem 724 can depend on the communication network(s) over which the computing device 700 is intended to operate. For example, the computing device 700 can include communication subsystems 724 designed to operate over a GSM network, a GPRS network, an EDGE network, a Wi-Fi or WiMax network, and a Bluetooth™ network. In particular, the wireless communication subsystems 724 can include hosting protocols such that the device 100 can be configured as a base station for other wireless devices.

An audio subsystem 726 can be coupled to a speaker 728 and a microphone 730 to facilitate voice-enabled functions, such as speaker recognition, voice replication, digital recording, and telephony functions. The audio subsystem 726 can be configured to facilitate processing voice commands, voiceprinting and voice authentication, for example.

The I/O subsystem 740 can include a touch-surface controller 742 and/or other input controller(s) 744. The touch-surface controller 742 can be coupled to a touch surface 746. The touch surface 746 and touch-surface controller 742 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 746.

The other input controller(s) 744 can be coupled to other input/control devices 748, such as one or more buttons, rocker switches, thumb-wheel, infrared port, USB port, and/or a pointer device such as a stylus. The one or more buttons (not shown) can include an up/down button for volume control of the speaker 728 and/or the microphone 730.

In one implementation, a pressing of the button for a first duration can disengage a lock of the touch surface 746; and a pressing of the button for a second duration that is longer than the first duration can turn power to the computing device 700 on or off. Pressing the button for a third duration can activate a voice control, or voice command, module that enables the user to speak commands into the microphone 730 to cause the device to execute the spoken command. The user can customize a functionality of one or more of the buttons. The touch surface 746 can, for example, also be used to implement virtual or soft buttons and/or a keyboard.

In some implementations, the computing device 700 can present recorded audio and/or video files, such as MP3, AAC, and MPEG files. In some implementations, the computing device 700 can include the functionality of an MP3 player, such as an iPod™.

The memory interface 702 can be coupled to memory 750. The memory 750 can include high-speed random-access memory and/or non-volatile memory, such as one or more magnetic disk storage devices, one or more optical storage devices, and/or flash memory (e.g., NAND, NOR). The memory 750 can store an operating system 752, such as Darwin, RTXC, LINUX, UNIX, OS X, WINDOWS, or an embedded operating system such as VxWorks.

The operating system 752 can include instructions for handling basic system services and for performing hardware dependent tasks. In some implementations, the operating system 752 can be a kernel (e.g., UNIX kernel). In some implementations, the operating system 752 can include instructions for performing fraud detection. For example, operating system 752 can implement the fraud detection features as described with reference to FIGS. 1-6.

The memory 750 can also store communication instructions 754 to facilitate communicating with one or more additional devices, one or more computers and/or one or more servers. The memory 750 can include graphical user interface instructions 756 to facilitate graphic user interface processing; sensor processing instructions 758 to facilitate sensor-related processing and functions; phone instructions 760 to facilitate phone-related processes and functions;

electronic messaging instructions 762 to facilitate electronic-messaging related processes and functions; web browsing instructions 764 to facilitate web browsing-related processes and functions; media processing instructions 766 to facilitate media processing-related processes and functions; GNSS/Navigation instructions 768 to facilitate GNSS and navigation-related processes and instructions; and/or camera instructions 770 to facilitate camera-related processes and functions.

The memory 750 can store software instructions 772 to facilitate other processes and functions, such as the fraud detection processes and functions as described with reference to FIGS. 1-6.

The memory 750 can also store other software instructions 774, such as web video instructions to facilitate web video-related processes and functions; and/or web shopping instructions to facilitate web shopping-related processes and functions. In some implementations, the media processing instructions 766 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 750 can include additional instructions or fewer instructions. Furthermore, various functions of the computing device 700 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
   receiving, by a submission collection module of a computing device, user submissions associated with a first plurality of user accounts, each submission describing one of a plurality of submission targets, wherein each user submission includes user identification information corresponding to a user account providing the corresponding user submission;
   in response to receiving the user submissions, generating, by the submission collection module for each user submission, a surrogate identifier that anonymizes user identification information, wherein the surrogate identifiers are dynamically generated after receiving the user submissions and before the user submissions are stored;
   replacing, by the submission collection module for each user submission, user identification information with a corresponding surrogate identifier that anonymizes the user submission;
   determining, by a fraud detection module of the computing device, a plurality of anonymous user groups based on the user submissions directed to the plurality of submission targets, each of the anonymous user groups including a corresponding subset of anonymous user accounts from the first plurality of user accounts;
   determining, by the fraud detection module, an impact score for each of the anonymous user groups based on a subset of the user submissions respectively associated with each of the anonymous user groups, each impact score representing how user submissions respectively associated with the respective anonymous user group change overall ratings of the plurality of submission targets;
   selecting, by the fraud detection module, one or more anonymous user groups having an impact score greater than a threshold percentage of other anonymous user groups, wherein the fraud detection module is prevented from accessing any user identification information associated with the user submissions; and
   automatically rejecting, by the computing device, user submissions associated with the selected one or more anonymous user groups.

2. The method of claim 1, further comprising:
   determining, by the computing device, the plurality of anonymous user groups based on the user submissions and one or more grouping criteria, the grouping criteria including: a time range for grouping user submissions, a minimum group size, a geographic area for grouping user submissions, and a minimum number of group submissions.

3. The method of claim 1, wherein each impact score indicates a magnitude of deviation to the overall ratings of submission targets caused by a respective anonymous user group for which the respective anonymous user group submitted corresponding user submissions, and wherein automatically rejecting the user submissions associated with the selected one or more anonymous user groups comprises deleting, blocking, or removing the user submissions associated with the selected one or more anonymous user groups.

4. The method of claim 1, further comprising:
   determining, by the computing device, a user credibility score for a particular anonymous user account associated with at least one user submission;
   rejecting, by the computing device, the at least one user submission based on the user credibility score failing to meet a threshold value; and
   in response to the particular anonymous user account being included in the selected anonymous user groups, updating, by the computing device, the user credibility score for the particular anonymous user account to prevent further user submissions from the particular anonymous user account to affect the submission targets.

5. The method of claim 1, further comprising:
   validating, for each user submission, an associated user account identifier;
   wherein the associated user account identifiers are replaced with surrogate identifiers after validating the associated user account identifiers.

6. The method of claim 1, further comprising:
   determining a first impact score for a particular anonymous user group based on user submissions received from the particular anonymous user group related to a first submission target;
   determining a second impact score for the particular anonymous user group based on user submissions received from the particular anonymous user group related to a second submission target; and
   generating an overall impact score for the particular anonymous user group based on the first impact score and the second impact score.

7. A non-transitory computer readable medium including one or more sequences of instructions that, when executed by one or more processors, cause the processors to perform operations comprising:

receiving, by a submission collection module of a computing device, user submissions associated with a first plurality of user accounts, each submission describing one of a plurality of submission targets, wherein each user submission includes user identification information corresponding to a user account providing the corresponding user submission;

in response to receiving the user submissions, generating, by the submission collection module for each user submission, a surrogate identifier that anonymizes user identification information, wherein the surrogate identifiers are dynamically generated after receiving the user submissions and before the user submissions are stored;

replacing, by the submission collection module for each user submission, user identification information with a corresponding surrogate identifier that anonymizes the user submission;

determining, by a fraud detection module of the computing device, a plurality of anonymous user groups based on the user submissions directed to the plurality of submission targets, each of the anonymous user groups including a corresponding subset of anonymous user accounts from the first plurality of user accounts;

determining, by the fraud detection module, an impact score for each of the anonymous user groups based on a subset of the user submissions respectively associated with each of the anonymous user groups, each impact score representing how user submissions respectively associated with the respective anonymous user group change overall ratings of the plurality of submission targets;

selecting, by the fraud detection module, one or more anonymous user groups having an impact score greater than a threshold percentage of other anonymous user groups, wherein the fraud detection module is prevented from accessing any user identification information associated with the user submissions; and automatically rejecting, by the computing device, user submissions associated with the selected one or more anonymous user groups.

8. The non-transitory computer readable medium of claim 7, wherein the instructions cause the processors to perform operations comprising:

determining, by the computing device, the plurality of anonymous user groups based on the user submissions and one or more grouping criteria, the grouping criteria including: a time range for grouping user submissions, a minimum group size, a geographic area for grouping user submissions, and a minimum number of group submissions.

9. The non-transitory computer readable medium of claim 7, wherein each impact score indicates a magnitude of deviation to the overall ratings of submission targets caused by a respective anonymous user group for which the respective anonymous user group submitted corresponding user submissions, and wherein automatically rejecting the user submissions associated with the selected one or more anonymous user groups comprises deleting, blocking, or removing the user submissions associated with the selected one or more anonymous user groups.

10. The non-transitory computer readable medium of claim 7, wherein the instructions cause the processors to perform operations comprising:

determining, by the computing device, a user credibility score for a particular anonymous user account associated with at least one user submission;

rejecting, by the computing device, the at least one user submission based on the user credibility score failing to meet a threshold value; and in response to the particular anonymous user account being included in the selected anonymous user groups, updating, by the computing device, the user credibility score for the particular anonymous user account to prevent further user submissions from the particular anonymous user account to affect the submission targets.

11. The non-transitory computer readable medium of claim 7, wherein the instructions cause the processors to perform operations comprising:

validating, for each user submission, an associated user account identifier; and wherein the associated user account identifiers are replaced with surrogate identifiers after validating the associated user account identifiers.

12. The non-transitory computer readable medium of claim 7, wherein the instructions cause the processors to perform operations comprising:

determining a first impact score for a particular anonymous user group based on user submissions received from the particular anonymous user group related to a first submission target;

determining a second impact score for the particular anonymous user group based on user submissions received from the particular anonymous user group related to a second submission target; and generating an overall impact score for the particular anonymous user group based on the first impact score and the second impact score.

13. A system comprising:

one or more processors; and a non-transitory computer readable medium including one or more sequences of instructions that, when executed by the one or more processors, cause the processors to perform operations comprising:

receiving, by a submission collection module of a computing device, user submissions associated with a first plurality of user accounts, each submission describing one of a plurality of submission targets, wherein each user submission includes user identification information corresponding to a user account providing the corresponding user submission, wherein the surrogate identifiers are dynamically generated after receiving the user submissions and before the user submissions are stored;

in response to receiving the user submissions, generating, by the submission collection module for each user submission, a surrogate identifier that anonymizes user identification information;

replacing, by the submission collection module for each user submission, user identification information with a corresponding surrogate identifier that anonymizes the user submission;

determining, by a fraud detection module of the computing device, a plurality of anonymous user groups based on the user submissions directed to the plurality of submission targets, each of the anonymous user groups including a corresponding subset of anonymous user accounts from the first plurality of user accounts;

determining, by the fraud detection module, an impact score for each of the anonymous user groups based on a subset of the user submissions respectively associated with each of the anonymous user groups, each impact score representing how user submissions respectively associated with the respective anonymous user group change overall ratings of submission targets;

selecting, by the fraud detection module, one or more anonymous user groups having an impact score greater than a threshold percentage of other anonymous user groups, wherein the fraud detection module is prevented from accessing any user identification information associated with the user submissions; and automatically rejecting, by the computing device, user submissions associated with the selected one or more anonymous user groups.

14. The system of claim 13, wherein the instructions cause the processors to perform operations comprising:

determining, by the computing device, the plurality of anonymous user groups based on the user submissions and one or more grouping criteria, the grouping criteria including: a time range for grouping user submissions, a minimum group size, a geographic area for grouping user submissions, and a minimum number of group submissions.

15. The system of claim 13, wherein each impact score indicates a magnitude of deviation to the overall ratings of submission targets caused by a respective anonymous user group for which the respective anonymous user group submitted corresponding user submissions, and wherein automatically rejecting the user submissions associated with the selected one or more anonymous user groups comprises deleting, blocking, or removing the user submissions associated with the selected one or more anonymous user groups.

16. The system of claim 13, wherein the instructions cause the processors to perform operations comprising:

determining, by the computing device, a user credibility score for a particular anonymous user account associated with at least one user submission;

rejecting, by the computing device, the at least one user submission based on the user credibility score failing to meet a threshold value; and in response to the particular anonymous user account being included in the selected anonymous user groups, updating, by the computing device, the user credibility score for the particular anonymous user account to prevent further user submissions from the particular anonymous user account to affect the submission targets.

17. The system of claim 13, wherein the instructions cause the processors to perform operations comprising:

validating, for each user submission, an associated user account identifier; and wherein the associated user account identifiers are replaced with surrogate identifiers after validating the associated user account identifiers.

18. The system of claim 13, wherein the instructions cause the processors to perform operations comprising:

determining a first impact score for a particular anonymous user group based on user submissions received from the particular anonymous user group related to a first submission target;

determining a second impact score for the particular anonymous user group based on user submissions received from the particular anonymous user group related to a second submission target; and generating an overall impact score for the particular anonymous user group based on the first impact score and the second impact score.

* * * * *